April 2, 1963 R. K. HATHAWAY ETAL 3,083,832
FILTER
Filed May 7, 1959
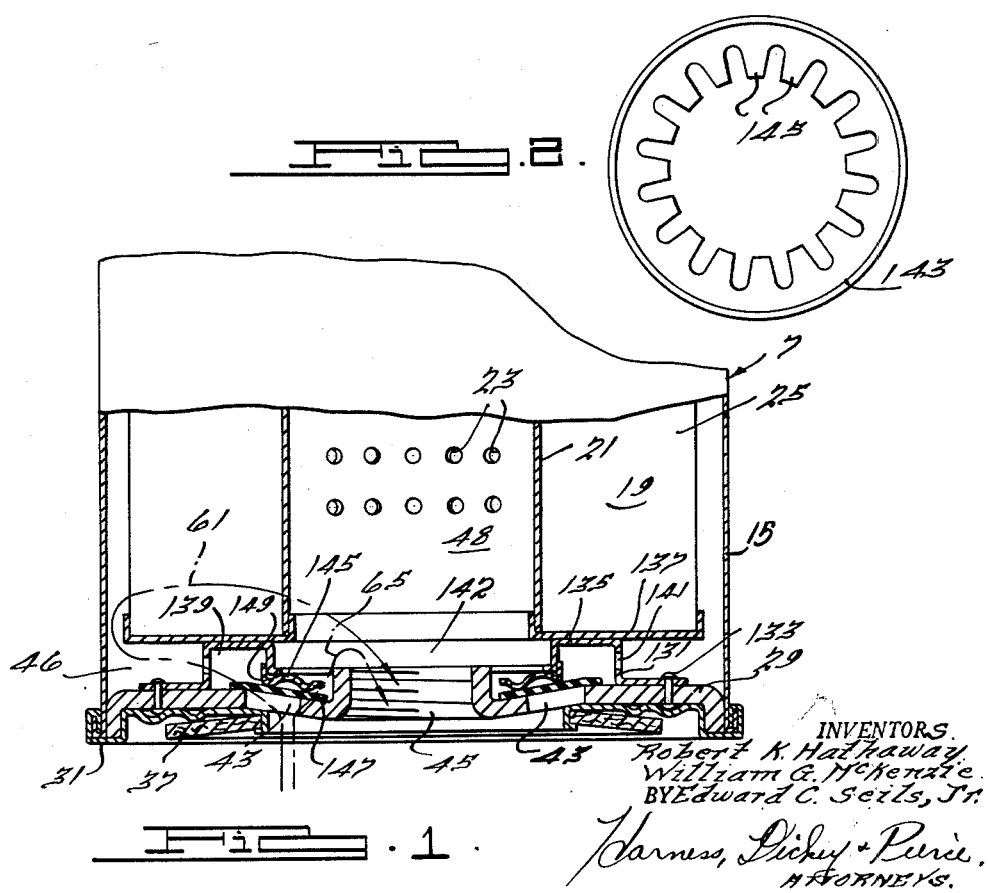
INVENTORS.
Robert K. Hathaway,
William G. McKenzie.
BY Edward C. Seils, Jr.
Harness, Dickey & Pierce.
ATTORNEYS.

3,083,832
FILTER

Robert K. Hathaway, William G. McKenzie, and Edward C. Seils, Jr., Racine, Wis., assignors, by mesne assignments, to Walker Manufacturing Company, Racine, Wis., a corporation of Delaware
Filed May 7, 1959, Ser. No. 811,756
3 Claims. (Cl. 210—130)

Our invention relates to filters and, in particular, to throw-away type filter assemblies.

In the throw-away type of filter device that is now known to the art, an annular cartridge of filter material, such as pleated paper, is contained within a cylindrical metal housing. The housing has a base plate which is adapted to be screwed on to the stand pipe, or into a threaded hole, of a filter mount which would be provided on the automobile engine or other machine with which the filter is to be used. In many of the filter devices of the type just described, valve elements are incorporated to prevent drainback of oil and to provide a by-pass or pressure relief in the event the filter element becomes clogged. It is the purpose of the present invention to provide a combined anti-drainback and by-pass valve for such filter devices.

The invention accomplishes the foregoing and other objects by means of a construction in which the valve means are associated with the base plate of the filter assembly and advantage is taken of certain flexible, elastic materials (which are unaffected by oil or the fluid being filtered), such as the synthetic rubbers, to serve as valves and/or seals.

The invention is illustrated in the accompanying drawings in which:

FIGURE 1 is a side elevation, partly broken away, of a throw-away filter assembly embodying the invention; and FIG. 2 is a detail plan view showing the spring element of FIG. 1.

The filter assembly 7 has a housing or casing in the form of an inverted cup or can 15. In the housing is an annular filter element or cartridge 19 which may be of many different forms. Preferably, it comprises a center tube 21, which is closed on top and perforated throughout its length as seen at 23, and which is surrounded by an annulus of pleated filter paper 25. The filter element 19 in FIG. 1 has a bottom end cap 137. The filter element 19 is spaced inwardly from the side wall of the housing 15 and above a base plate 29. The base plate 29 fits in the lower end of the housing 15 and is secured tightly to it by means of the thin bottom plate 31 which is interlocked at 33 with the end of the can 15. The bottom plate 31 is adapted at its inner diameter 35 to grip and hold a gasket ring 37. It is provided with a circular rib 39 to pinch the gasket against the filter mounting and the ring 41 to control the extent of compression of the gasket. The base plate 29 has a plurality of angularly spaced apertures 43 formed in it which constitute the inlet openings for oil flowing into the filter device. The plate 29 also has a neck 45 which extends upwardly into the center tube 21 and is threaded so that it can be screwed on to the stand pipe of the filter mount. (Obviously, the neck 45 could be reversed and threaded on its outer diameter and thus adapted to screw into an aperture on the filter mount if that is desired.) The inside of the neck 45 constitutes the outlet for oil leaving the filter device.

It will be clear that oil will flow upwardly through the inlet apertures 43 into an inlet chamber 46 comprising the space beneath, on the outside, and on the top of cartridge 19. Oil in the inlet chamber flows transversely through the filter paper 25 and apertures 23 into the outlet chamber 48 comprising the space inside of center tube 21, and from there it flows down through the neck 45 and to the bearings to be lubricated.

In the event that the oil is cold and sluggish or the filter paper 25 becomes sufficiently clogged to create substantial resistance to flow, it is desirable that the oil by-pass the cartridge 19 and flow from inlet openings 43 into the outlet neck 45, i.e. from inlet chamber 46 to outlet chamber 48 without passing through the filter element.

In the filter assembly 7 a single valve unit is employed to serve as an anti-drainback valve and as a by-pass valve. The design is also unique in that these various valve parts are separate from the filter element or cartridge 19 and constitute a part of the base plate assembly. In the structure of FIG. 1, a formed sheet metal pad 131 is attached by rivets or other suitable means 133 to the base plate 29 and has a flat top surface 135 which serves as a seat for the conventional end cap 137 of the filter element 19. The space within the member 131 constitutes a part of inlet chamber 46 for receiving liquid from the inlet openings 43 and delivering it through the openings 141 to the space beneath the filter element 19 and between the filter element and the can 15. The member 131 has a lip 142 located on its inner periphery which is substantially larger in diameter than neck 45 and which is turned down to engage in a concave portion of a metal spring element 143 which is shown in plan view in FIG. 2. The radial, inwardly extending fingers 145 of the spring member 143 press upon the inner peripheral portion of an annular, flexible sealing and valve member 147 which rests upon the slanted portion of the base plate 29 and has an outer peripheral portion to overlie the openings 43. The heel 149 of the spring member 143 engages the outer portion of the valve member 147 located somewhat outwardly from the portion engaged by spring fingers 145 but inwardly from the outermost portions of the openings 43. Thus, oil entering through openings 43 is able to lift the outer portion of the rubber ring 147 about the heel 149 as a fulcrum to flow into space 139 and through openings 141 to follow filter path 61. The outer portion of the ring valve 147 prevents drainback since reverse flow will cause it to cover up inlet openings 43.

In the event that resistance to flow through the paper 25 increases to a predetermined amount, the pressure of the oil entering at 43 will cause the spring fingers 145 to move upwardly and the inner peripheral portion of the flexible valve member 147 to move upwardly so that oil can follow the path 65 to by-pass beneath the bottom of the cartridge 19 into the neck 45 of the member 29.

What is claimed is:

1. In a throw-away type filter device, a housing, a base plate closing one end of the housing and having an inlet and an outlet formed therein for the flow of fluid to the device, a filter element mounted within the housing, a member engaged by said filter element and engaging said base plate and acting to space the bottom of the filter element from the base plate, said member including an aperture in the path of flow of fluid from the inlet of said base plate to the outlet of said base plate, flow through said aperture by-passing and flowing in a path spaced from said filter element to said outlet, and a single valve member between the base plate and filter element at one end of said housing for controlling flow through both said aperture and said inlet, said valve member comprising a flexible member having a portion arranged to prevent back flow through said inlet, said flexible member including a portion movable upon a predetermined fluid pressure to provide for by-passing of fluid directly from said inlet to said aperture and outlet.

2. The invention set forth in claim 1 wherein said valve member comprises a single rubber disk having an outer radial portion and an inner radial portion, one of said radial portions acting to prevent back flow and the other acting to provide for by-passing.

3. In a throw-away type filter device, a housing, a base plate closing one end of the housing and having an inlet and an outlet for the flow of fluid to the device, a filter element mounted within the housing, a member engaged by said filter element and engaging said base plate and acting to space the bottom of the filter element from the base plate, said member including an aperture in the path of flow of fluid from the inlet to the outlet of the filter device, a resilient ring in the path of flow of fluid beneath said filter element in a direction to by-pass said filter element, and comprising a resilient ring supported by said base plate and having inner and outer elastically movable peripheries, one of said peripheries controlling back flow through said base plate inlet and the other controlling by-pass flow through said member aperture.

References Cited in the file of this patent

UNITED STATES PATENTS

| | | |
|---|---|---|
| 1,166,000 | Pelton | Dec. 28, 1915 |
| 1,874,976 | Hans | Aug. 30, 1932 |
| 2,210,213 | Long | Aug. 6, 1940 |
| 2,311,320 | Williams | Feb. 16, 1943 |
| 2,537,241 | Smith | Jan. 9, 1951 |
| 2,559,267 | Winslow et al. | July 3, 1951 |
| 2,731,154 | Burnell | Jan. 17, 1956 |
| 2,734,636 | Foster | Feb. 14, 1956 |
| 2,877,902 | Chase et al. | Mar. 17, 1959 |
| 2,884,133 | Walulik et al. | Apr. 28, 1959 |
| 2,886,180 | Morgan et al. | May 12, 1959 |
| 2,888,141 | Coates et al. | May 26, 1959 |
| 2,894,630 | Humbert | July 14, 1959 |
| 2,995,249 | Boewe et al. | Aug. 8, 1961 |

FOREIGN PATENTS

| | | |
|---|---|---|
| 678,934 | Great Britain | Sept. 10, 1952 |